(12) United States Patent
Chien et al.

(10) Patent No.: US 11,664,671 B2
(45) Date of Patent: May 30, 2023

(54) BATTERY CHARGING STATION AND METHOD FOR MANAGING BATTERIES

(71) Applicant: Gogoro Inc., Hong Kong (CN)

(72) Inventors: Yu-Chang Chien, Taoyuan (TW); Pei-Chang Kuo, Taoyuan (TW); Shih-Chan Chiu, Taoyuan (TW)

(73) Assignee: Gogoro Inc., Hong Kong (CN)

( * ) Notice: Subject to any disclaimer, the term of this patent is extended or adjusted under 35 U.S.C. 154(b) by 246 days.

(21) Appl. No.: 17/107,147

(22) Filed: Nov. 30, 2020

(65) Prior Publication Data

US 2021/0175724 A1 Jun. 10, 2021

(30) Foreign Application Priority Data

Dec. 6, 2019 (TW) .................................. 108144789

(51) Int. Cl.
*H01M 10/44* (2006.01)
*H01M 10/46* (2006.01)
*H02J 7/00* (2006.01)

(52) U.S. Cl.
CPC ............ *H02J 7/007* (2013.01); *H02J 7/0013* (2013.01); *H02J 2207/20* (2020.01)

(58) Field of Classification Search
CPC .. H02J 7/007; H02J 7/0013; H02J 7/00; H02J 2207/20; Y02T 90/12; Y02T 10/70; B60L 53/30; B60L 53/67; B60L 53/80
(Continued)

(56) References Cited

U.S. PATENT DOCUMENTS

2004/0130292 A1 7/2004 Buchanan et al.
2009/0325056 A1* 12/2009 Greening .......... H01M 10/4207
320/128
(Continued)

FOREIGN PATENT DOCUMENTS

CN 108382221 A 8/2018
CN 110071497 A * 7/2019
(Continued)

OTHER PUBLICATIONS

Office Action received for co-pending Taiwanese Application No. TW108144789, Applicant: Gogoro Inc., dated Jul. 23, 2020, 6 pages.
(Continued)

*Primary Examiner* — Edward Tso
(74) *Attorney, Agent, or Firm* — Perkins Coie LLP

(57) ABSTRACT

A battery charging station includes a power bus, a power supplying unit, a first voltage converting unit and a processor. The power supplying unit receives a first power to generate a second power accordingly and transmits the second power to the power bus as a supplying power of the power bus. The first voltage converting unit is coupled to the power bus and is connected to a first battery removably disposed in the battery station. The processor sets the first voltage converting unit to operate in a first mode or a second mode, the first voltage converting unit in the first mode receives the supplying power from the power bus so as to charge the first battery. The first voltage converting unit in the second mode receives the electrical power from the first battery and generates a second mode power towards the power bus.

20 Claims, 10 Drawing Sheets

(58) Field of Classification Search
USPC .................................. 320/128, 104, 109, 116
See application file for complete search history.

(56) References Cited

U.S. PATENT DOCUMENTS

| | | | |
|---|---|---|---|
| 2017/0163051 A1* | 6/2017 | Morita | H02J 1/106 |
| 2018/0083457 A1* | 3/2018 | Huang | H02J 7/007182 |
| 2019/0168630 A1* | 6/2019 | Mrlik | B60L 53/51 |
| 2019/0366868 A1* | 12/2019 | Tseng | B60L 53/16 |

FOREIGN PATENT DOCUMENTS

| | | |
|---|---|---|
| TW | I553999 B | 10/2016 |
| WO | 2010082506 A1 | 7/2010 |

OTHER PUBLICATIONS

Search Report received for copending European Application No. EP20211208.2, Applicant: Gogoro Inc., dated Apr. 8, 2021, 4 pages.

\* cited by examiner

BATTERY CHARGING STATION AND METHOD FOR MANAGING BATTERIES

CROSS-REFERENCE TO RELATED APPLICATION

This application claims priority to Taiwan Application Serial Number 108144789, filed Dec. 6, 2019, which is herein incorporated by reference in its entirety.

BACKGROUND

Field of Invention

This disclosure relates to an electronic device and method, and in particular to a battery charging station and managing method for managing batteries.

Description of Related Art

In the current system configuration, the user can exchange the portable battery in the electric vehicle (especially in the electric motorcycle) at the specific battery-exchange station, so as to supplement the electric vehicle with available electrical power. However, the current battery-exchange station has following defects: (1) it is required to install an uninterruptible power system (UPS) having idle batteries for preventing the interruption of mains electricity; (2) it can only charge the portable battery; (3) the system cannot charge the portable battery when the mains electricity is interrupted for a long time; (4) the system switches to an idle state when the portable battery is full of electrical power.

SUMMARY

In order to solve the above-described problems, the present invention is to provide the embodiments to maintain the operation of charging station and enhance the management efficiency of the charging/discharging of multiple batteries.

The present invention discloses a battery charging station. The battery charging station includes a power bus, a power supplying unit, a first voltage converting unit and a processor. The power supplying unit is coupled to the power bus and is configured to generate a second power according to a first power received from the exterior and transmit the second power to the power bus as a supplying power of the power bus. The first voltage converting unit is coupled to the power bus and is configured to connect to a first battery removably disposed in the battery station. The processor is electrically coupled to the power bus and is communicatively coupled to the first voltage converting unit. When the processor controls the first voltage converting unit to operate in a first mode, the first voltage converting unit in the first mode receives the supplying power from the power bus so as to charge the first battery. When the processor controls the first voltage converting unit to operate in a second mode, the first voltage converting unit in the second mode receives the electrical power from the first battery and generates a second mode power towards the power bus, wherein the voltage level of the second mode power is lower than the voltage level of the second power.

The present invention discloses a method for managing batteries applied to a processor of a battery charging station. The battery charging station includes a power supplying unit and a first voltage converting unit which are coupled to a power bus, the first voltage converting unit is connected to a first battery removably disposed in the battery charging station, and the method for managing batteries includes: controlling the power supplying unit to receive a first power from the exterior and generate a second power, wherein the power supplying unit transmits the second power to the power bus as a supplying power of the power bus; and controlling the first voltage converting unit to switch between at least a first mode or a second mode. The first voltage converting unit in the first mode receives the supplying power from the power bus so as to charge the first battery. The first voltage converting unit in the second mode receives the electrical power from the first battery and generates a second mode power towards the power bus, wherein the voltage level of the second mode power is lower than the voltage level of the second power.

BRIEF DESCRIPTION OF THE DRAWINGS

Embodiments of the disclosed technology will be described and explained through the use of the accompanying drawings.

DETAILED DESCRIPTION

The embodiments are described in detail below with reference to the appended drawings to better understand the aspects of the present disclosure. However, the provided embodiments are not intended to limit the scope of the disclosure, and the description of the structural operation is not intended to limit the order in which they are performed. Any device that has been recombined by components and produces an equivalent function is within the scope covered by the disclosure.

The present disclosure relates to a battery charging station and operation method thereof and is mainly implemented by the specific relation between the voltage convertors. The processor of the battery charging station can control the charging voltage and the discharging voltage of the voltage convertor, so that the system can still be operated according to the portable battery when the mains electricity is unavailable. Also, the electrical power stored by the portable battery can be efficiently transferred. Accordingly, the managing system can still provide the service of exchanging battery for the user even if the mains electricity is unavailable.

Figure 1:
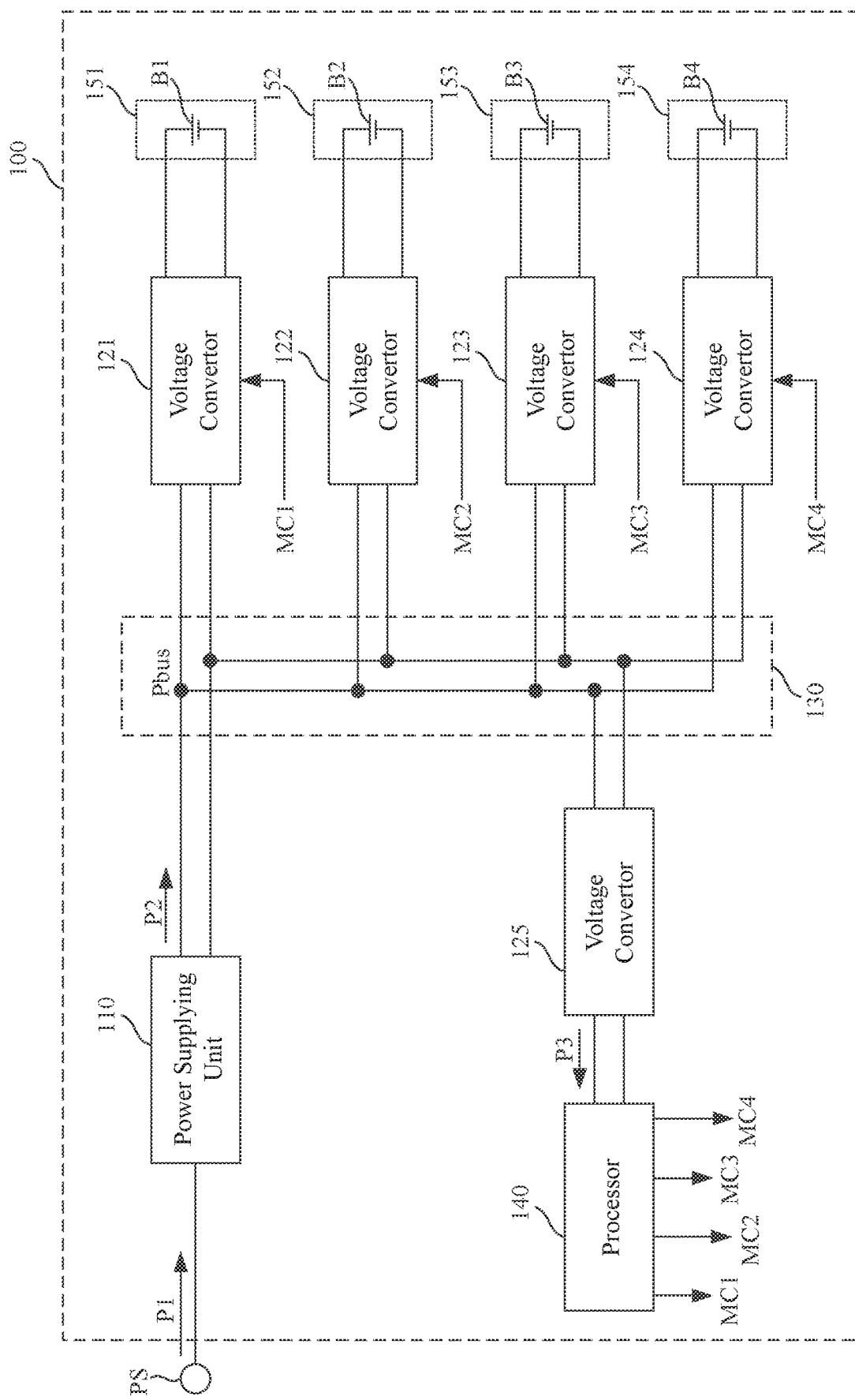
FIG. 1 is a schematic diagram of a battery charging station according to some embodiments of the present disclosure.

Referring to FIG. 1, FIG. 1 is a schematic diagram of a battery charging station 100 according to some embodiments of the present disclosure. The battery charging station 100 is connected to an external power supplying source PS (e.g. mains electricity grids, energy storage system or renewable energy generator such as solar panel, wind driven generator, etc.). In an embodiment, the battery charging station 100 can use the electrical power provided by the mains electricity grids to charge or exchange the batteries that are carried by the transport vehicle (e.g. electric motorcycle, electric car or hybrid electric car, etc.) or that have the same standard but used for other purposes. For example, the battery charging station 100 can be disposed at a proper location in the city (e.g. beside the intersection with heavy traffic or at the locations, easy for the user to use, such as convenience store, gas station, etc.). When nearing the battery charging station 100, the user can insert the battery into the battery charging station 100 for charging the battery. Also, when cooperating with the proper battery subscription service, the user can obtain another battery with higher electrical power after inserting the battery. During the above-described charging or exchanging of the batteries, the battery charging station 100 can collect or analyze the information stored in the transport vehicle or the battery. In some embodiments, the battery carried by the transport vehicle is portable and rechargeable battery. The battery can be used as the electrical power source for the electronic products on the transport vehicle or be used as the power source for the movement of the transport vehicle simultaneously.

In some embodiments of the present disclosure, when the external power supplying source PS is unavailable (e.g. mains electricity grids are interrupted, or renewable energy generator does not generate electrical power) or the input path of external electrical power meets problems, the battery charging station 100 and the voltage convertor therein can be switched to operate in different modes, so that the basic operation of the battery charging station 100 can be maintained by using the electrical power stored in the above-described battery. The detail for switching mode would be further described in the following embodiments.

As shown in FIG. 1, the battery charging station 100 can include a power supplying unit 110, a plurality of voltage convertors 121-125, a power bus 130, a processor 140 and a plurality of battery accommodating portions 151-154. In this embodiment, the power supplying unit 110 is electrically coupled to the external power supplying source PS. The power supplying unit 110 can transform the electricity standard of a power P1 supplied by the power supplying source PS into the electricity standard of a power P2 that is required by the interior of the battery charging station 100. The power supplying unit 110 also outputs the power P2 to the power bus 130 as a supplying power, so as to provide to other components in the battery charging station 100.

The power supplying source PS is the electrical power supplying source external to the battery charging station MS, e.g. mains electricity grids, renewable energy such as solar energy, wind power, etc., energy storage device, etc. The installer can select to set the power supplying unit 110 corresponding to the power supplying source PS according to the difference between the power sources that the power supplying source PS can provide (that is, AC power source or DC power source) and the voltage level. For example, when the power supplying source PS is mains electricity grids, the power P1 provided by the power supplying source PS may be the AC power source with voltage of 220 volts (V) or higher. The power supplying unit 110 can include corresponding AC/DC and/or DC/DC voltage convertor, so as to convert the power P1 (the AC power source with 220 V) into the power P2. In an actual example, when the power supplying source PS normally provides the electrical power and the power supplying unit 110 normally operates, the power P2 converted by the power supplying unit 110 has predetermined electricity standard. For example, the power P2 can be the DC power source with voltage between 330 and 440 V (such as the DC power source with 395 V). That is to say, when the power supplying source PS normally provides the electrical power as well as the power supplying unit 110 normally operates, the supplying power Pbus of the power bus 130 would be the DC power source with 395 V. That is, the supplying power Pbus equals the power P2 generated by the power supplying unit 110.

As shown in FIG. 1, the voltage convertor 125 is coupled between the power bus 130 and the processor 140. The voltage convertor 125 is configured to convert the supplying power Pbus of the power bus 130 into the power P3 that is required by the processor 140. For example, the processor 140 is the high-precision integrated circuit such as central processor, application specific integrated circuit (ASIC) or other similar controlling circuits. The processor 140 requires the operation voltage that is stable and relative low, such as 1.5 V, 5 V, 12 V, 15 V, etc. The voltage convertor 125 generates the corresponding power P3 according to the requirement of the processor 140. The processor 140 can be the main control unit (MCU) of the battery charging station 100 and includes at least one memory and at least one microprocessor which are electrically coupled to each other. The microprocessor can access the instruction codes and execute the application program that is defined by the instruction codes, so as to operate the battery charging station 100. The microprocessor can be central processor, application specific integrated circuit (ASIC) or other similar controlling circuits.

For example, the batteries B1-B4 as shown in FIG. 1 are provided for the user to exchange the battery having low electrical power in the transport vehicle. In some embodiments, when part or all of the portable batteries in the vehicle of the user have insufficient electrical power, the user can move the transport vehicle near the site at which the battery charging station 100 is installed and insert the battery having low electrical power in the vehicle into the empty battery accommodating portion (e.g. one of the battery accommodating portions A1-A4) of the battery charging station 100. During the procedure of charging battery, the user can take out the battery, which was inserted previously, after the charging is completed (or when the user requires the battery). During the procedure of exchanging battery, after inserting the battery into the empty battery accommodating portion of the battery charging station 100, the user can obtain the portable battery having high electrical power from the battery charging station 100 by operating or the programs of the battery charging station 100. The obtained battery is removed from the battery charging station 100 and is connected to the transport vehicle of the user, so as to complete the procedure of exchanging battery.

In the embodiment of FIG. 1, the battery charging station 100 includes four battery accommodating portions 151-154 and four corresponding voltage convertors 121-124. The battery accommodating portions 151-154 each is configured to accommodate one portable and rechargeable battery. As shown in figure, the battery accommodating portions 151-154 accommodate the batteries B1-B4 respectively. The voltage convertors 121-124 are coupled between the power bus 130 and the battery accommodating portions 151-154 (and the corresponding batteries B1-B4). It is required to specially describe that the battery charging station 100 of the present disclosure takes four battery accommodating portions 151-154 as the example for description, but the present disclosure is not limited thereto. In the practical application, the battery charging station 100 can include N of battery accommodating portions and corresponding N+1 of the voltage convertors, where N is any positive integer that is equal or greater than 2. In some embodiments, the battery charging station 100 can include 8, 16 or more groups of the voltage convertors and the battery accommodating portions. Accordingly, more batteries can be simultaneously accommodated for charging and exchanging, so as to provide a large number of users to exchange the battery. In some embodiments, the number of the battery accommodating portions and the number of the voltage convertors are in one-to-one relationship, it might be also in many-to-one or one-to-many relationship.

For convenience of description, the following embodiments give the battery charging station 100 having four battery accommodating portions 151-154, which are connected to the batteries B1-B4, as the example to describe. However, the present disclosure is not limited thereto. For example, in practical example, the battery charging station 100 usually includes one or more battery accommodating portions that have not been connected to the batteries, so as to receive the battery from the user.

Figure 2A:
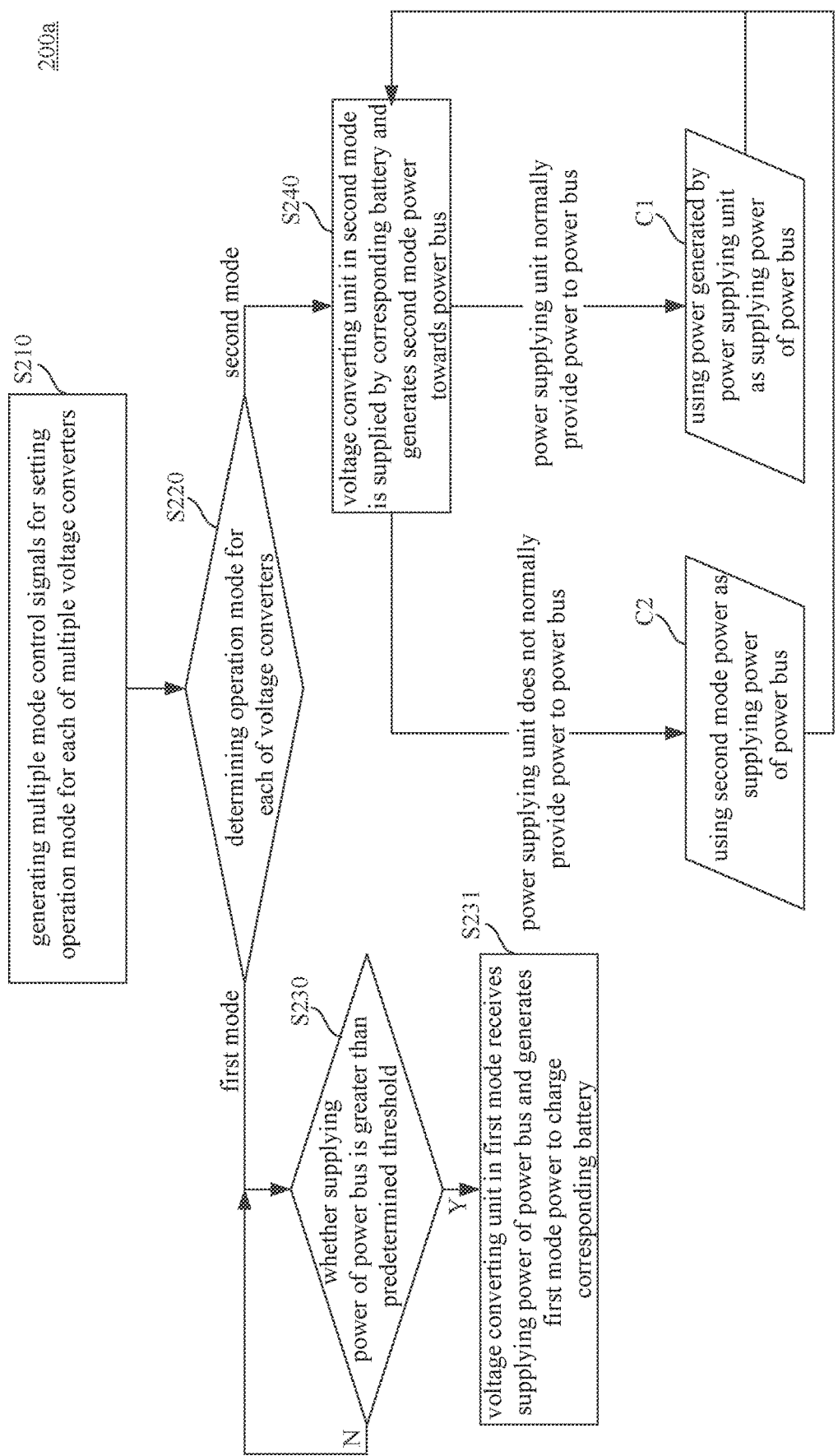
FIG. 2A is a flow diagram of a control method of the present disclosure.

Referring to FIG. 2A, FIG. 2A is a flow diagram of a control method 200a of the present disclosure. As shown in FIGS. 1 and 2A, the control method 200a is configured to control the battery charging station 100 and the operation modes of four voltage convertors 121-124 in the battery charging station 100.

In step S210, the processor 140 generates four mode control signals MC1-MC4, and four mode control signals MC1-MC4 are configured to set the operation modes for four voltage convertors 121-124 respectively. In some embodiments, the mode control signals MC1-MC4 transmitted from the processor 140 can be configured to enable/disable the voltage convertors 121-124, to control the operation modes of the voltage convertors 121-124, to control the electricity standard (e.g. voltage level, current level, power level, etc.) converted by the voltage convertors 121-124, or to control the current direction of the voltage convertors 121-124.

In the present embodiment, the operation modes of the voltage convertors 121-124 each at least include a first mode and a second mode. The first mode is an operation mode that one of the voltage convertors 121-124 drains the supplying power Pbus of the power bus 130 from the power bus 130 so as to charge the corresponding batteries B1-B4. The second mode is an operation mode that one of the voltage convertors 121-124 drains the electrical power from the corresponding batteries B1-B4 to the power bus 130 so as to sustain the supplying power Pbus of the power bus 130. The mode control signals MC1-MC4 generated by the processor 140 can respectively set each of the voltage convertors 121-124 in the independent operation mode.

In step S220, when the voltage convertors 121-124 receives the respective mode control signals MC1-MC4 respectively, the voltage convertors 121-124 each operate in the respective operation modes (e.g. the first mode or the second mode) according to the received mode control signals MC1-MC4.

Figure 3:
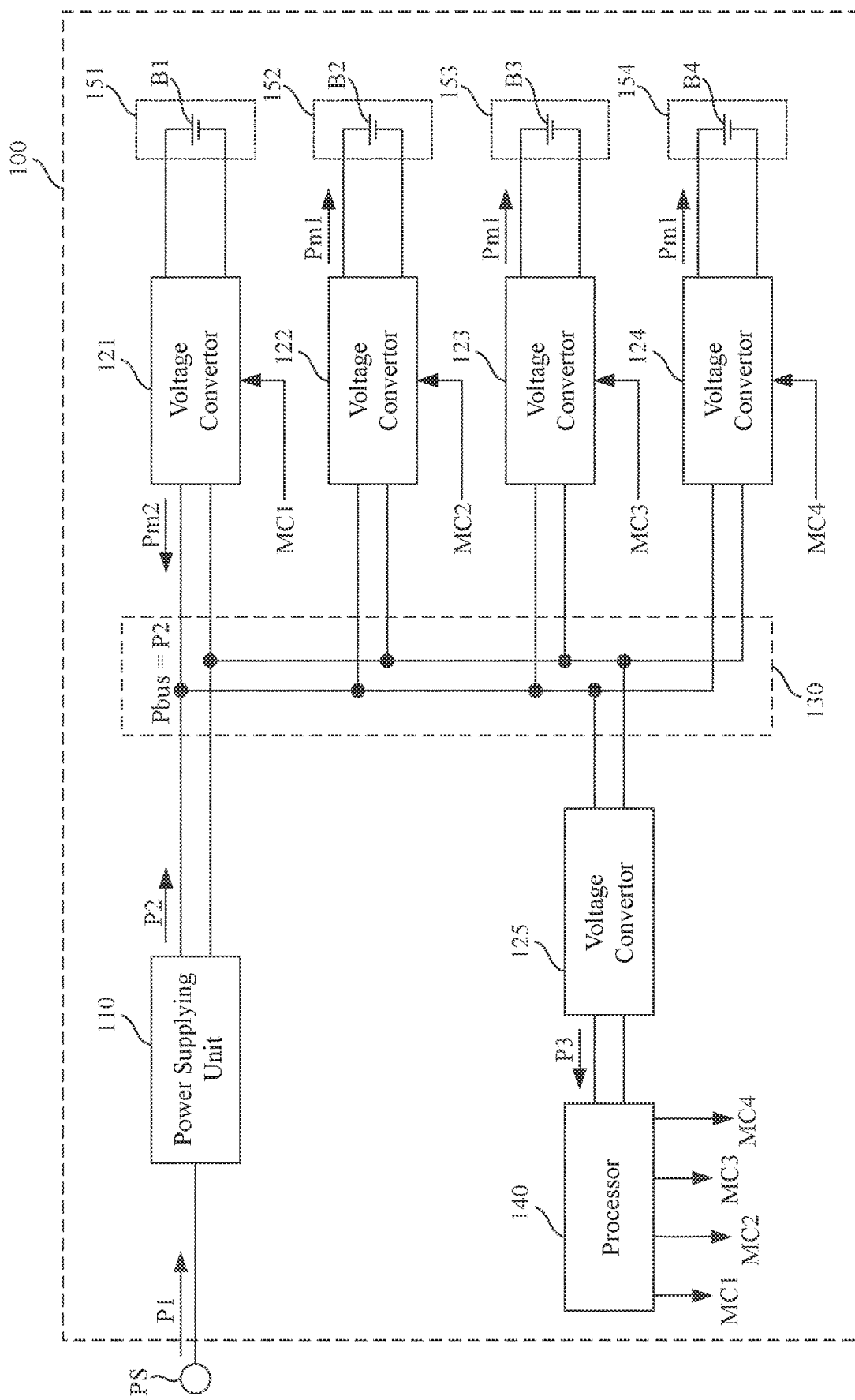
FIG. 3 is a schematic diagram of multiple voltage convertors, which are switched to operate in respective operation modes, in the battery charging station according to an embodiment.

Referring to FIG. 3, FIG. 3 is a schematic diagram of four voltage convertors 121-124, which are switched to operate in respective operation modes, in the battery charging station 100 of an embodiment. In the embodiment of FIG. 3, the processor 140 sets the voltage convertor 121 to operate in the second mode through the mode control signal MC1 and sets the voltage convertors 122-124 each to operate in the first mode through the mode control signals MC2-MC4.

For example, when the battery B2 is properly disposed in the battery accommodating portion 152, the battery B2 is electrically coupled to the voltage convertor 122. If the battery B2 is the battery having low electrical power inserted by the user, the processor 140 then controls the voltage convertor 122 to operate in the first mode. As shown in FIGS. 2A and 3, the voltage convertor 122 in the first mode can execute the step S231 to convert the supplying power Pbus of the power bus 130 into a first mode power Pm1 and charge the battery B2 with the first mode power Pm1. Similarly, as shown in FIGS. 2A and 3, the voltage convertor 123 and the voltage convertor 124 are also set to operate in the first mode. The voltage convertor 123 and the voltage convertor 124 in the first mode also execute the step S231 to convert the supplying power Pbus of the power bus 130 into the first mode power Pm1 and charge the corresponding batteries B3 and B4 with the first mode power Pm1.

As shown in FIG. 3, when the power supplying source PS normally provides the electrical power and the power supplying unit 110 normally operates, the supplying power Pbus of the power bus 130 is the DC power source with substantially 395 V (the supplying power Pbus equals the power P2 provided by the power supplying unit 110 at this time). The voltage convertors 122-124 can convert the supplying power Pbus into the first mode power Pm1 with voltage between 40 and 50 V (for example, the voltage is equal or slightly greater than 48 V or 43.2 V) so as to charge batteries B2-B4.

As shown in FIG. 2A, in some embodiments, before generating the first mode power Pm1 in the step S231, the method further includes the step S230. As shown in FIGS. 2A and 3, in the step S230, the voltage convertors 122-124 in the first mode choose whether to enter the step S231 according to whether the voltage of the supplying power Pbus of the power bus 130 is greater than the predetermined threshold. As shown in FIGS. 2A and 3, the voltage of the input power (that is, the supplying power Pbus of the power bus 130) converted by the voltage convertors 122-124 in the first mode is required to be greater than the predetermined threshold before the step S231 is executed. For example, the predetermined threshold can be set as 380 V. When the voltage of the supplying power Pbus of the power bus 130 is greater than the predetermined threshold, the input power converted by the voltage convertors 122-124 in the first mode generates the first mode power Pm1. In some embodiments, when voltage of the supplying power Pbus of the power bus 130 is lower than the predetermined threshold (e.g. 380 V), the voltage convertors 122-124 do not execute the step S231. That is, the voltage convertors 122-124 do not generate the first mode power Pm1.

As shown in FIGS. 2A and 3, the processor 140 sets the voltage convertor 121 to operate in the second mode through the mode control signal MC1. The voltage convertor 232 in the second mode would execute the step S240. The voltage convertor 232 drains the electrical power from the corresponding battery B1 and generates a second mode power Pm2 towards the power bus 130.

It is required to specially describe that, in the present embodiment, the voltage level of the second mode power Pm2 generated by the voltage convertor 121 in the second mode is lower than the voltage level of the power P2 generated by the power supplying unit 110. In an embodiment, the voltage level of the second mode power Pm2 can be set to be about 350 V. In the condition that the power supplying unit 110 normally operates to generate the power P2, although the voltage convertor 121 generates the second mode power Pm2 towards the power bus 130, the second mode power Pm2 generated by the voltage convertor 121 would not generate any current to the power bus 130 because the voltage level of the second mode power Pm2 is lower than the voltage level of the power P2. In the embodiment of FIG. 3, the supplying power Pbus of the power bus 130 still equals the power P2. It is worth noting that the DC/DC convertor in the voltage convertors 121-124 and the peripheral circuits thereof have effect of independence and isolation. Therefore, in the condition that the above-described power bus 130 has greater voltage level, the supplying power (that is, power P2) of the power bus would also not flow into the voltage convertor 121 and is even converted into the second mode power to charge the battery B1.

Figure 5B:
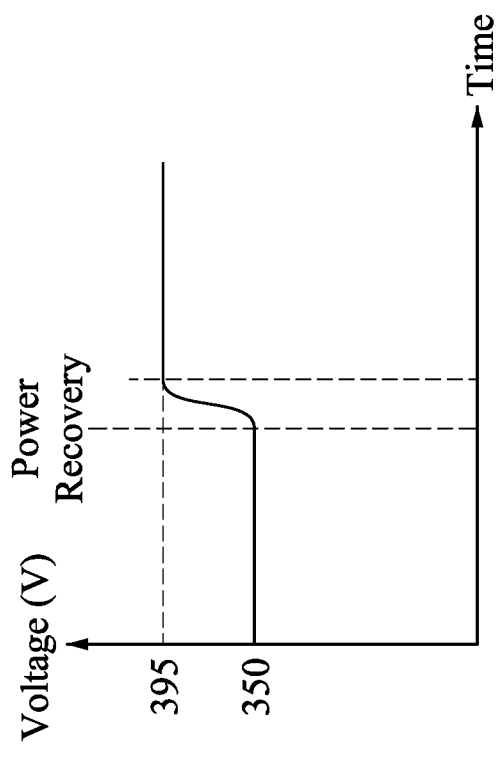
FIG. 5B is a schematic diagram of the voltage level of the power bus according to some embodiments of the present disclosure.
Figure 5A:
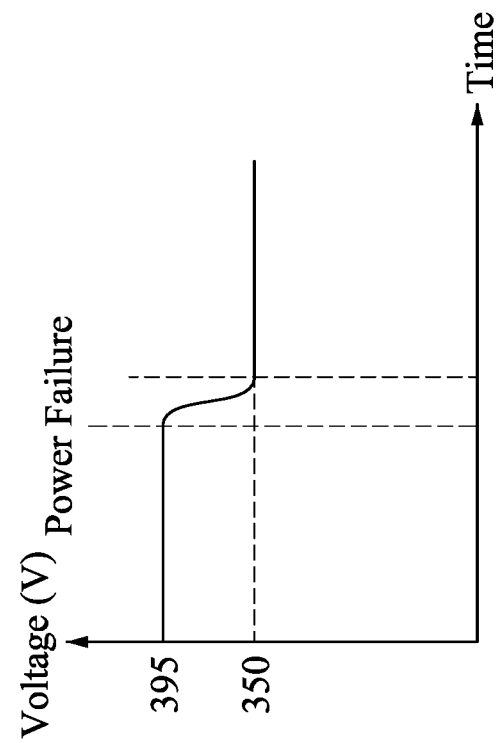
FIG. 5A is a schematic diagram of the voltage level of the power bus according to some embodiments of the present disclosure.

Referring to FIG. 5A, FIG. 5A is a timing diagram of the voltage level of the supplying power Pbus as the power supplying source PS normally provides the electrical power and the power supplying unit 110 normally operates until the power P2 is unavailable. In the present embodiment, the processor 140 sets the voltage convertor 121 to operate in the second mode and sets the voltage convertors 122-124 to operate in the first mode (as shown in FIG. 3). As shown in FIGS. 2A, 3 and 5A, when the power supplying unit 110 normally generates the power P2 to the power bus 130 (that is, before the power failure occurs in FIG. 5A), the state C1 is entered. The power P2 generated by the power supplying unit 110 is used as the supplying power Pbus of the power bus 130. In the present embodiment, it is required to specially describe that the state C1 is a state that automatically occurs when the power supplying unit 110 normally provides the electrical power. The processor 140 is not required to perform extra determination or control.

Figure 4:
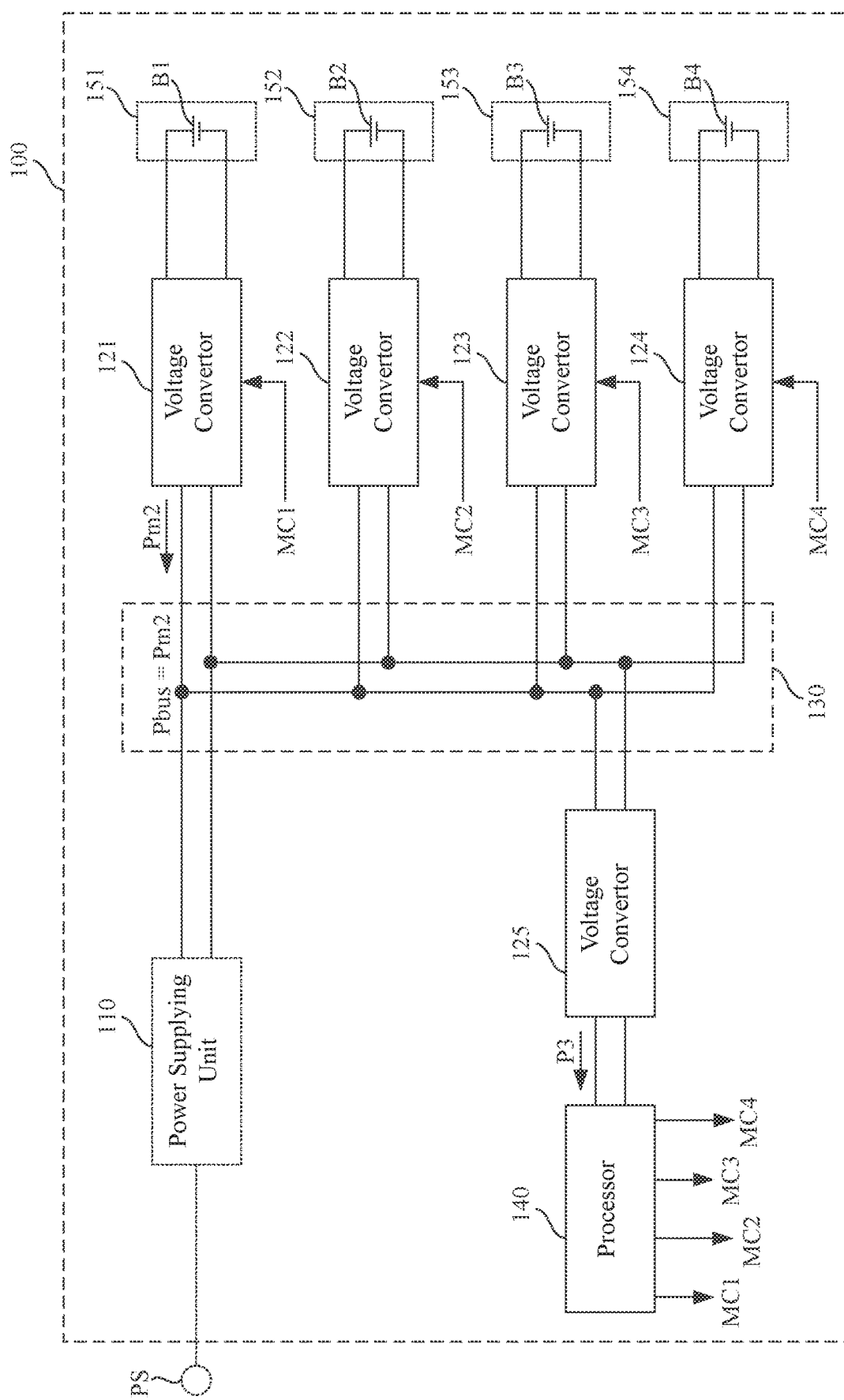
FIG. 4 is a schematic diagram of multiple voltage convertors, which are switched to operate in respective operation modes, in the battery charging station according to an embodiment.

Referring to FIG. 4, FIG. 4 is a schematic diagram of the battery charging station 100 when the power P2 of FIG. 3 is unavailable. As shown in FIGS. 2A, 4 and 5A, when the power P2 is unavailable (for example, the external power supplying source PS is interrupted, the wire path connected to the external power supplying source PS is disconnected, the power supplying unit 110 is damaged, the wire path connected between the power supplying unit 110 and the power bus 130 is disconnected), the state C2 is entered. The second mode power Pm2 generated by the voltage convertor 121 is automatically used as the supplying power Pbus of the power bus 130. In the present embodiment, it is required to specially describe that the state C2 is a state that automatically occurs when the power supplying unit 110 does not normally provide the electrical power. Since the voltage convertor 121 has generated the second mode power towards the power bus (e.g. step S240), the second mode power Pm2 is automatically used as the supplying power Pbus of the power bus 130 as soon as the power P2 is unavailable. The processor 140 is not required to perform extra determination or control.

As shown in FIGS. 4 and 5A, when the power (e.g. the power P2 of FIG. 3) generated by the input of external electrical power is unavailable, the voltage of the supplying power Pbus would decrease. However, the supplying power Pbus would be immediately kept at the voltage level (e.g. 350 V) of the second mode power Pm2 generated by the voltage convertor 121. At this time, the voltage convertor 125 can still generate the power P3 according to the supplying power Pbus of the power bus 130 so as to maintain the basic operation of the processor 140. In some embodiments, the application programs related to the basic operation executed by the processor 140 mainly include the application program for enabling/disabling the power supplying unit 110, the application program for enabling/disabling the voltage convertors 121-124, the application program for detecting the operation state of the battery accommodating portions 151-154, the application program for detecting the operation state of the batteries B1-B4, the application program for displaying frame by human-machine interface, the application program for communicating with server, etc.

It is required to specially describe that the voltage convertor 121 in the second mode and the corresponding battery B1 can be used as the standby electrical power source of the battery charging station 100. As soon as the abnormal state (such as, the interruption of the external power supplying source PS, the disconnection to the external power supplying source PS, the damage of the power supplying unit 110, or the disconnection between the power supplying unit 110, the power bus 130, etc.) occurs, the second mode power Pm2 generated by the voltage convertor 121 can provide the electrical power immediately. The voltage level of the supplying power Pbus of the power bus 130 is kept to match the second mode power Pm2, so as to maintain the operation of the battery charging station 100.

In some other examples, the detecting circuit can be used to monitor the voltage of the power bus 130. After abnormal reduction in the voltage is detected, the standby electrical power source is triggered (for example, external standby power is drained, or the voltage convertor 121 is set to operate in the second mode). In such way, the supplying power Pbus of the power bus 130 would dramatically decrease first, and then gradually recover as soon as the standby electrical power source is available. That may cause the damage to the battery charging station 100 or cause the processor 140 to be unable to operate. By comparison, in the present disclosure, the voltage convertor 121 in the second mode and the corresponding battery B1 has generated the second mode power Pm2 towards the power bus 130 when the power (e.g. the power P2 of FIG. 3) has not failed yet. Once the abnormality occurs, the second mode power Pm2 can keep the supplying power Pbus of the power bus 130 immediately. The steps (such as, detecting the voltage of the power bus 130 through the detecting circuit, determining the reduction in the voltage, triggering the standby electrical power source, etc.) are not required from the occurrence of the abnormality to the generation of the second mode power Pm2.

Referring to FIG. 5B, FIG. 5B is a timing diagram of the voltage level of the supplying power Pbus when the power supplying source PS and the power supplying unit 110 return to the normal operation. When the power (e.g. the power P2 of FIG. 3) generated by the input of external electrical power is recovered, the supplying power Pbus of the power bus 130 returns to the voltage level of the power P2.

It is required to supplement the description. In the embodiment of FIG. 4, because the voltage level (350 V) of the second mode power Pm2 is not greater than the predetermined threshold (380 V) of the voltage convertors 122-124, the input power converted by the voltage convertors 122-124 in the first mode would temporarily not generate the first mode power Pm1, so that the batteries B2-B4 are not charged. In such way, it is ensured that the second mode power Pm2 is mainly used to maintain the basic operation of the battery charging station 100, so that the electrical power of the battery (e.g. the first battery B1 coupled to the voltage convertor 121) that provides the second mode power Pm2 would not be rapidly consumed. When the input of external electrical power is recovered, the supplying power Pbus would return to the voltage level of the power P2, which is greater than the predetermined threshold (380 V) of the voltage convertors 122-124. Therefore, the voltage convertors 122-124 in the first mode would generate the first mode power Pm1 through the supplying power Pbus, so that the batteries B2-B4 are charged. In some embodiments, if the electrical power of the batteries B2-B4 is greater than the electrical power threshold (e.g. 90% or 95% of the electrical power or lower thereto) that can provide for the user, the battery charging station 100 can still provide the battery (those among the batteries B2-B4 and match the electrical power threshold) to the user. In a condition that there is no battery having enough electrical power for the user, the battery charging station 100, which maintains operation, can inform nearby user the current condition of the battery charging station 100 by displaying message or playing audio. In some embodiments, when the processor 140 controls the voltage convertor 121 to operate in the second mode, the processor 140 can lock the battery accommodation portion 151, so as to prevent the battery B1 from being took out mistakenly.

In the embodiment of FIGS. 3 and 4, the processor 140 which sets the voltage convertor 121 to operate in the second mode is given as the example to describe. However, the present disclosure is not limited thereto. The processor 140 can set any one or at least one of the voltage convertors 121-124 to operate in the second mode, so that the above-described purpose can be achieved.

In some prior art, an uninterruptible power system can be disposed between the processor of the battery charging station and the mains electricity to prevent from the interruption of the mains electricity. When the mains electricity is asserted, the mains electricity can supply the processor and charge a fixing battery in the uninterruptible power system simultaneously. When the mains electricity is deasserted, the processor is constantly supplied by the fixing battery in the uninterruptible power system until the mains electricity is recovered. However, using the fixing battery as the standby uninterruptible power source would easily cause the damage to the discharging function of the fixing battery because the fixing battery is kept in a charging state for a long time and has not been discharged. When the abnormality occurs, the fixing battery would not provide the electrical power efficiently.

In the present disclosure, the voltage convertor in the second mode and the battery are used as the standby electrical power instead of using the fixing battery. In some embodiments, the processor 140 can replace the voltage convertor operating in the second mode periodically, or dynamically adjust the voltage convertor operating in the second mode according to the existing electrical power of individual battery.

It should be understood. In some embodiments, the processor 140 can monitor the electrical power of the batteries B1-B4 so as to determine whether the batteries B1-B4 can continue to be charge/discharge. In some embodiments, when the processor 140 detects that the electrical power of the battery B1 is lower than the predetermined threshold (e.g. 10%), the processor 140 can disable or control the voltage convertor 121 to operate in the first mode (that is, the charging mode). The processor 140 also controls at least one of the voltage convertors 122-124 to operate in the second mode (that is, the discharging mode), so as to output voltage of 350 V through the batteries B2-B4. The processor 140 can select at least proper one of the batteries B2-B4 according to the electrical power or other information of the batteries B2-B4. This mechanism can be understood as that the processor 140 can be supplied by another one of the batteries B2-B4 when the electrical power of the battery B1 used as the uninterruptible power system is not enough. In such configuration, the processor 140 can switch different battery to be used as the uninterruptible power system according to the electrical power, so that the battery charging station 100 can still operate when the power supplying source PS is unavailable for a long time. Even if the battery charging station 100 has no battery having enough electrical power to provide, the above-described mechanism can still allow the battery charging station 100 to communicate with the back-end server and other battery charging stations (not shown) of the energy network. The mechanism can not only notify the user to charge or exchange the battery through other battery charging station in real-time, but also allow the operator of the back-end server and the energy network to obtain the current operational situation of the battery charging station 100 in real-time, so as to decrease the operating cost. In some embodiments, the processor 140 detects the electrical power of the battery used as the standby power (e.g. the battery B1 of FIG. 4). When the electrical power of the battery is lower than the predetermined electricity threshold (e.g. 10% or 20%), the processor 140 can controls the battery charging station 100 to be in a sleep state or a low-performance state. The processor 140 can calculate the minimum electrical power that is required for turning off the battery charging station 100. When the remaining electrical power of the battery B1 equals the above-described minimum electrical power, the battery charging station 100 is turned off. In some embodiments, when the processor 140 detects that the power P2 inputted by the power supplying unit 110 is unavailable or that the current voltage level of the supplying power Pbus equals the voltage level of the second mode power Pm2, the processor 140 directly uses the power P3 converted from the second mode power Pm2 to be in the sleep state/low-performance state or turn off.

In the embodiment as shown in FIG. 2A, the processor 140 sets the voltage convertors 121-124 to operate in the first mode or the second mode through the mode control signals MC1-MC4. However, the present disclosure is not limited to the above-described two modes.

Figure 2B:
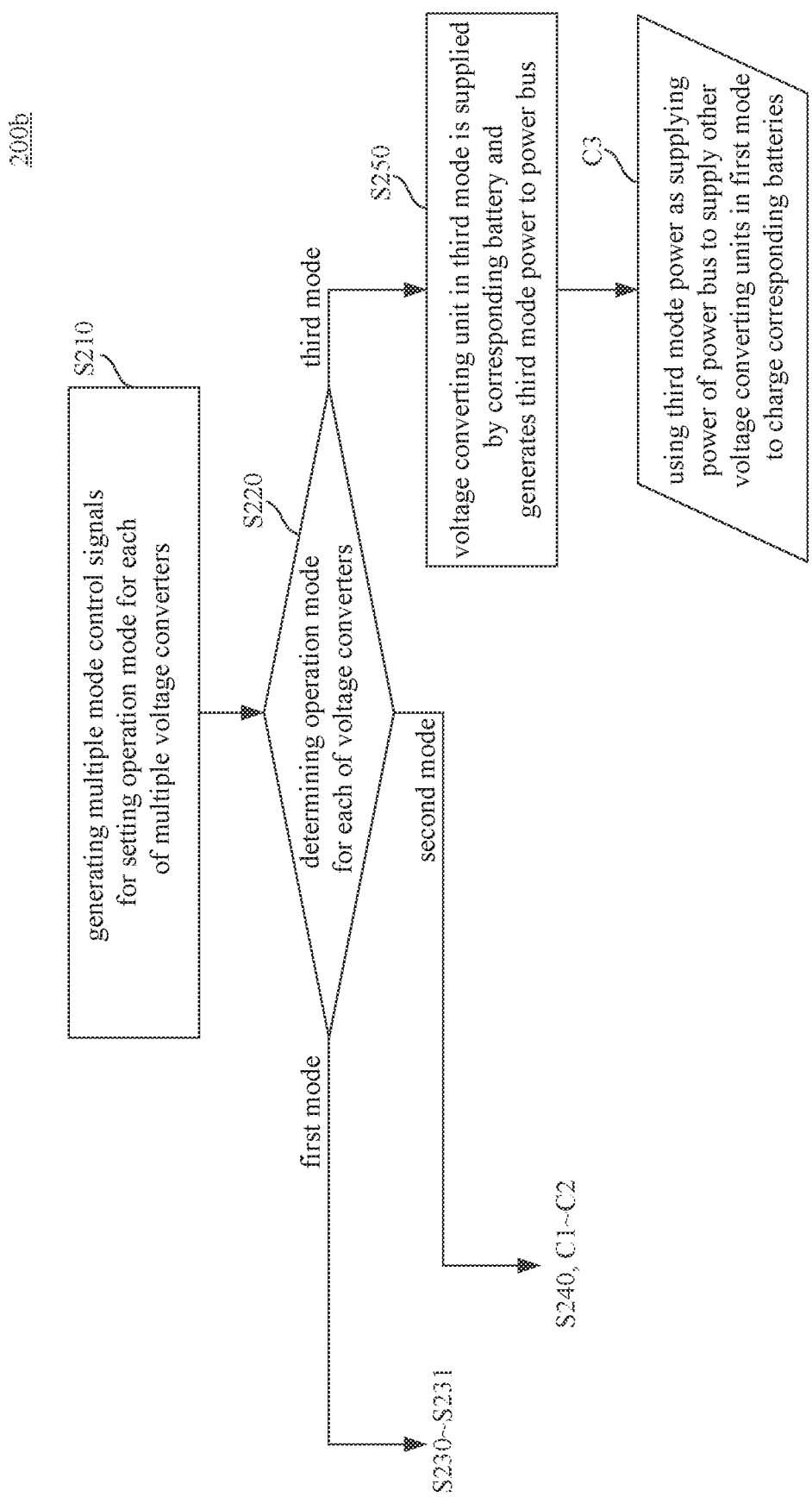
FIG. 2B is a flow diagram of a control method of the present disclosure.

Referring to FIG. 2B, FIG. 2B is a flow diagram of a control method 200b of the present disclosure. The control method 200b as shown in FIG. 2B is configured to control the battery charging station 100 and the operation modes of four voltage convertors 121-124 in the battery charging station 100.

In the embodiment of FIG. 2B, the control method 200b can also set the voltage convertors 121-124 to operate in the first mode or the second mode. That is to say, the control method 200b includes the steps S210, S220, S230-S231, S240 and the states C1-C2 of FIG. 2A. Similar steps have been described in the above embodiments, the descriptions thereof are omitted.

The difference is that the processor 140 of FIG. 1 can set the voltage convertors 121-124 to operate in one of the first mode, the second mode and the third mode in the control method 200*b* of the embodiment of FIG. 2B.

Figure 6:
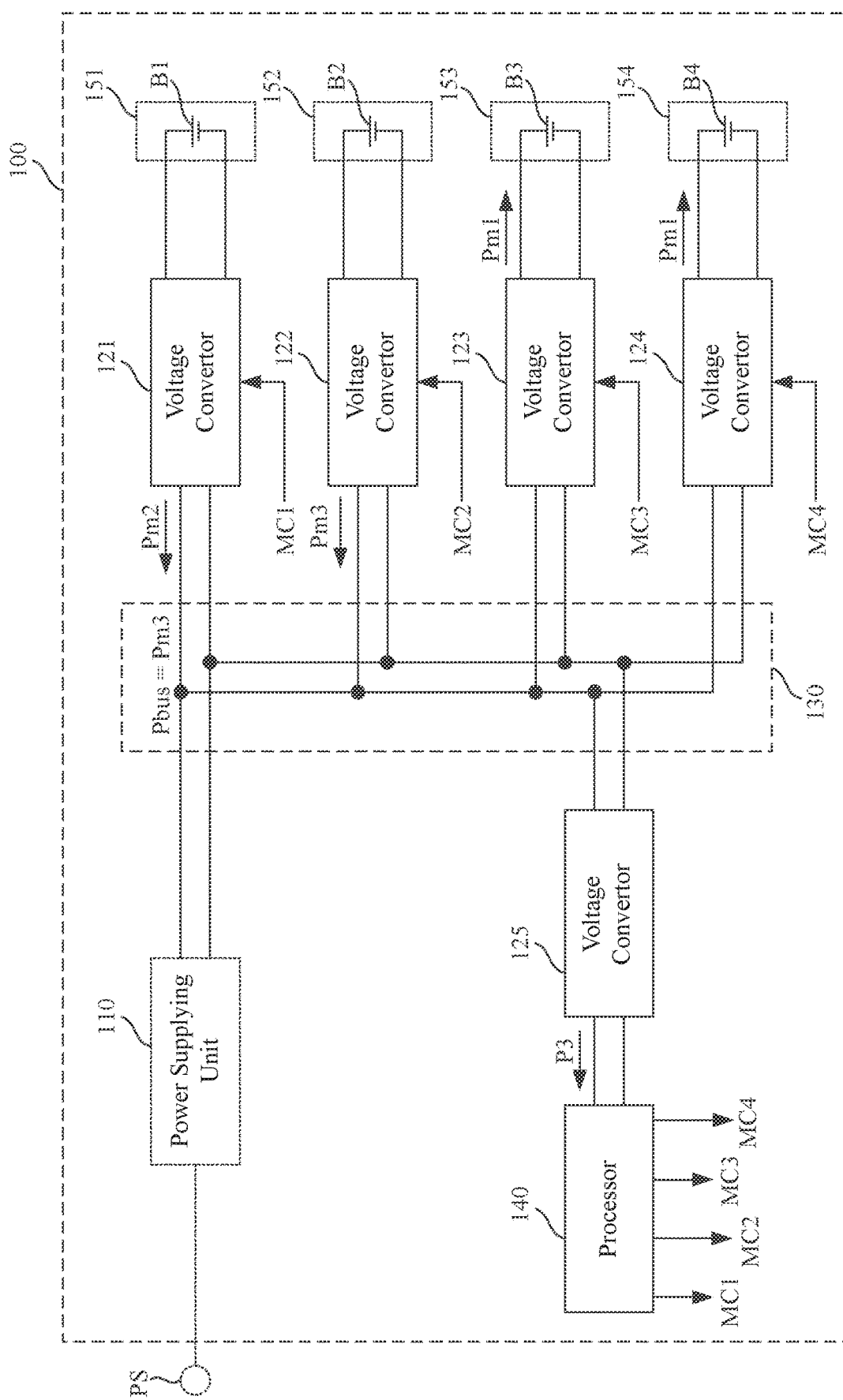
FIG. 6 is a schematic diagram of multiple voltage convertors, which are switched to operate in respective operation modes, in the battery charging station according to an embodiment.

Referring to FIG. 6, FIG. 6 is another schematic diagram of the battery charging station 100 when the power P2 of FIG. 3 is unavailable. The structure of system as shown in FIG. 6 is substantially same as those of FIG. 4. In some embodiments, when the power supplying source PS or the power supplying unit 110 is unavailable (especially for a long time), the processor 140 can control one of the voltage convertors 121-124 to operate in the third mode. In the embodiment of FIG. 6, it is assumed that the processor 140 controls the voltage convertor 122 to operate in the third mode, controls the voltage convertor 121 to operate in the second mode and controls the voltage convertors 123 and 124 to operate in the first mode.

At this time, as shown in FIGS. 2B and 6, the voltage convertor 122 in the third mode would execute the step S250. The voltage convertor 122 is supplied by the corresponding battery and generates the third mode power Pm3 to the power bus 130. In the present embodiment, the voltage level of the third mode power Pm3 can be set to be lower than the voltage level (395 V) of the power P2, greater than the voltage level (350 V) of the second mode power Pm2 and greater than the predetermined threshold (380 V) of the input power converted by the voltage convertors (e.g. the voltage convertors 123-124 of FIG. 6) operating in the first mode. For example, the voltage level of the third mode power Pm3 can be set to be from about 385 V to about 390 V.

Accordingly, the processor 140 can dynamically arrange the electrical power stored in the batteries B1-B4. The third mode can be understood as an inter-battery charging mode. For example, in the embodiment of FIG. 6, the processor 140 can control the voltage convertor 122 to operate in the third mode. After the power P2 provided by the power supplying unit 110 is unavailable, the state C3 is entered. The third mode power Pm3 generated by the voltage convertor 122 is used as the supplying power Pbus of the power bus 130. In the present embodiment, the state C3 is a state that automatically occurs when the power supplying unit 110 does not normally provide the electrical power. In a condition that the power P2 is unavailable, the third mode power Pm3 is automatically used as the supplying power Pbus of the power bus 130 when the voltage convertor 122 operating in the third mode is existed to generate the third mode power Pm3 (e.g. the step S250 of FIGS. 2B and 6). At this time, the supplying power Pbus of the power bus 130 is greater than the predetermined threshold (380 V) of the input power that is required by the voltage convertors 123-124 in the first mode to perform charging. Therefore, the voltage convertors 123-124 in the first mode would receive the third mode power Pm3 currently used as the supplying power Pbus, so that the voltage convertors 123-124 generate the first mode power Pm1 to charge the corresponding batteries B3-B4 respectively. Meanwhile, because the voltage level of the second mode power Pm2 is lower than the voltage level of the third mode power Pm3, the second mode power Pm2 towards the power bus 130 would still not generate any current to the power bus 130.

In an embodiment, the processor 140 can control any one of the voltage convertors 121-124 to operate in the third mode, so as to charge the one having lower electrical power in the batteries B1-B4 through the one having higher electrical power in the batteries B1-B4. For another example, the processor 140 can control at least one of the voltage convertors 121-124 to operate in the third mode, so as to use some batteries having lower electrical power in the batteries B1-B4 to charge other batteries. The said other batteries are charged to a certain degree (for example, to be full of electrical power). However, the present disclosure is not limited thereto.

It should be understood. By above-described configuration, when the power supplying source PS (and the power supplying unit 110) is available, the processor 140 can sequentially/simultaneously control the voltage convertors 121-124 to operate in the first mode so as to charge one or some of the batteries B1-B4. One or some of the batteries B1-B4 are tried to be charged to have full electrical power, so that the battery full of electrical power would be provided to the user, and that the battery having low electrical power exchanged by the user would be received. When the power supplying source PS (or the power supplying unit 110) is unavailable, the processor 140 can control the voltage convertors 121-124 to operate in the third mode, so that at least one of the batteries B1-B4 can be used as the electrical power supplying source for maintaining the operation of the processor 140. Because the electrical power stored by the batteries B1-B4 each might be different, the processor 140 can switch the voltage convertors 121-124 to operate in the first mode or the second mode. The electrical power of some of the batteries can be transferred to other batteries, and some of the batteries B1-B4 can be charged to be full of electrical power, so as to provide to the user.

In the embodiment of FIG. 6, the processor 140 switches the voltage convertor 122 to operate in the third mode, so as to supply the voltage convertor 123 and the voltage convertor 124 which are operated in the first mode. However, the present disclosure is not limited thereto. In some embodiments, the processor 140 disables one or more voltage convertors, so that only the instructed battery is allowed to be charged through the third mode power Pm3. For example, the processor 140 disables the voltage convertor 124, so that only the battery B3 connected to the voltage convertor 123 can be charged through the third mode power Pm3 used as the supplying power Pbus.

Figure 7:
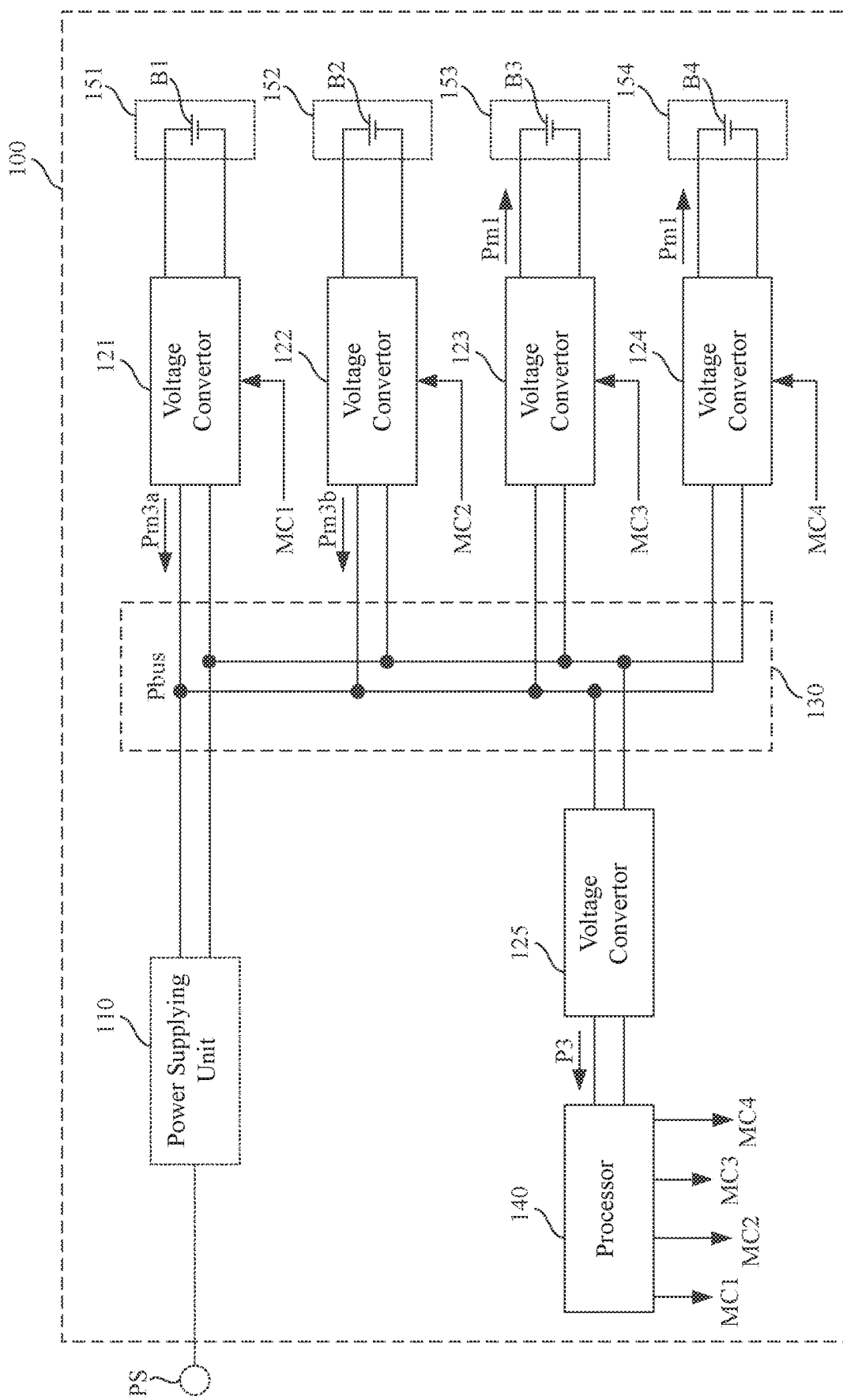
FIG. 7 is a schematic diagram of multiple voltage convertors, which are switched to operate in respective operation modes, in the battery charging station according to an embodiment.

Referring to FIG. 7, FIG. 7 is a schematic diagram of the battery charging station 100 according to some embodiments of the present disclosure. Referring to FIG. 6 together, the structure of system of the battery charging station 100 of FIG. 7 is substantially same as those of FIG. 6. In some embodiments, when the power supplying source PS (or the power supplying unit 110) is unavailable, the processor 140 can control at least two of the voltage convertors 121-124 to operate in the third mode (that is, the inter-battery charging mode). Accordingly, the processor 700 can connect at least two of the batteries B1-B4 in parallel, so as to charge other batteries.

In some embodiments, the processor 140 can control the voltage convertors 121, 122 to operate in the third mode, so that the voltage convertors 121, 122 respectively generate the third mode power Pm3*a* and Pm3*b* according to the electrical power of the batteries B1, B2 and output the third mode power Pm3*a* and Pm3*b* to the power bus 130. It can be understood that the batteries B2, B3 are connected in parallel to output to the power bus 130. At this time, the supplying power Pbus of the power bus 130 can be the sum of two of the third mode power Pm3*a* and Pm3*b*. Similarly, the voltage convertors 123-124 in the first mode can generate the first mode power Pm1 according to the supplying power Pbus of the power bus 130, so as to charge the respective batteries B3-B4.

It should be understood. By above-described configuration, the processor 140 can switch the mode (the first mode or the third mode) of the voltage convertors 121-124, so that some of the batteries B1-B4 are connected in parallel to discharge. Accordingly, other batteries can be rapidly charged, so that some of the batteries B1-B4 are charged to be full of electrical power and can be provided to the user. After the power supplying source PS normally supplies and the power supplying unit 110 are resumed to provide the power P2, the power P2 would be used as the supplying power Pbus of the power bus 130 since the voltage level of the power P2 is still greater than the above-described third mode power Pm3, Pm3a and pm3b. The third mode power Pm3, Pm3a and pm3b which towards the power bus 130 would not generate any current to the power bus 130.

Figure 2C:
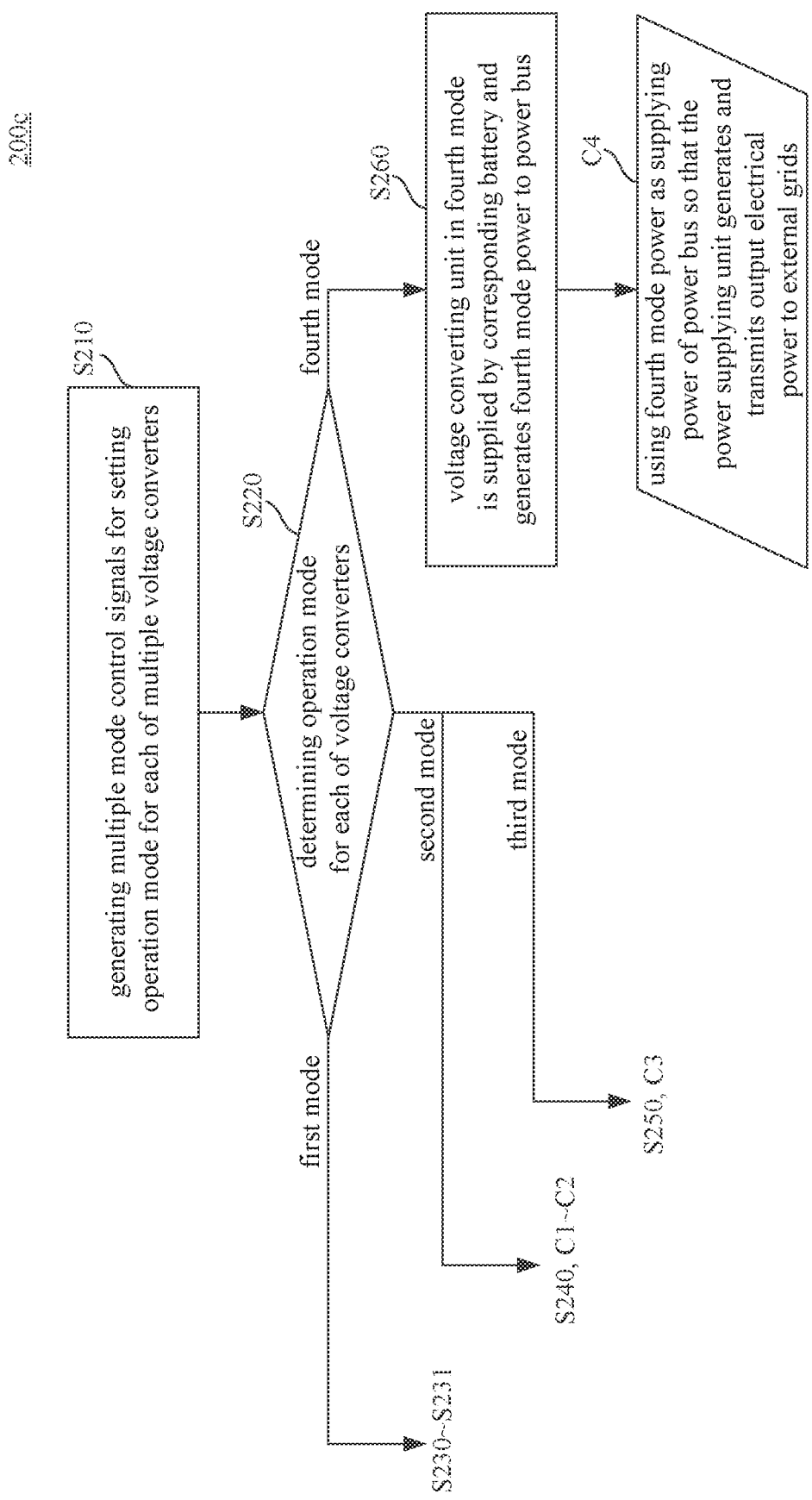
FIG. 2C is a flow diagram of a control method of the present disclosure.
Figure 8:
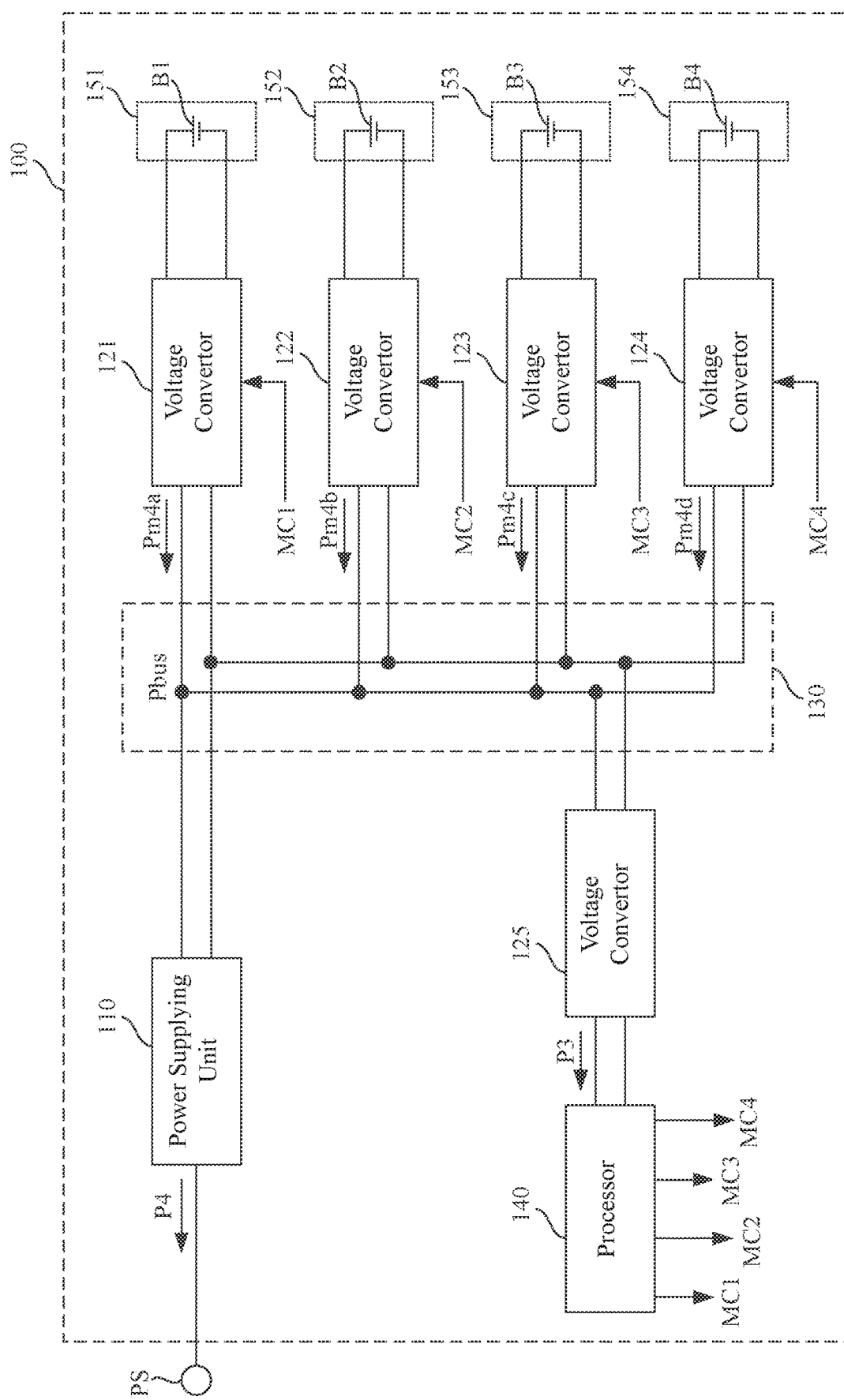
FIG. 8 is a schematic diagram of multiple voltage convertors, which are switched to operate in respective operation modes, in the battery charging station according to an embodiment.

Referring to FIGS. 2C and 8, FIG. 2C is a flow diagram of the control method 200c of the present disclosure. The control method 200c as shown in FIG. 2C is configured to control the battery charging station 100 and the operation modes of four voltage convertors 121-124 in the battery charging station 100.

In the embodiment of FIG. 2C, the control method 200c also can set the voltage convertors 121-124 to operate in the first mode, the second mode or the third mode. That is to say, the control method 200c includes the steps S210, S220, S230-S231, S240, S250 and the states C1-C3 of FIGS. 2A and 2B. Similar steps have been described in the above embodiments, the descriptions thereof are omitted.

FIG. 8 is a schematic diagram of the battery charging station 100 according to some embodiments of the present disclosure. In some embodiments, the processor 140 can monitor the electrical power of the batteries B1-B4. When the electrical power of all the batteries B1-B4 (or over half of the batteries, such as the batteries B1-B3) are greater than the predetermined threshold (e.g. 90% or 99%), the processor 140 can control part or all of the voltage convertors 121-124 (or the voltage convertors 121-123 corresponding to the batteries B1-B3) to operate in the fourth mode according to the external message or the analysis of internal data (for example, analysis revealing that the current requirement for battery is low, or requirement from the government or other emergency). In the present embodiment, the fourth mode can be understood as a power feedback mode. The battery charging station 100 in the fourth mode can output the electrical power stored by the batteries B1-B4 to the external power supplying source PS (e.g. mains electricity grids or external energy storage system).

For example, as shown in FIG. 8, it is assumed that the electrical power of the batteries B1-B4 each are greater than the predetermined threshold. The processor 140 respectively switches the voltage convertors 121-124 to operate in the fourth mode. The voltage convertors 121-124 in the fourth mode execute the step S260. The voltage convertors 121-124 are supplied by the corresponding batteries B1-B4, generate the fourth mode power Pm4a, Pm4b, Pm4c and Pm4d and output the fourth mode power Pm4a, Pm4b, Pm4c and Pm4d to the power bus 130. At this time, as shown in FIGS. 2C and 8, the state C4 is entered. The fourth mode power Pm4a, Pm4b, Pm4c and Pm4d generated by the voltage convertors 121-124 operated in the fourth mode are used as the supplying power Pbus of the power bus 130. The supplying power Pbus of the power bus 130 can be the sum of four of the fourth mode power Pm4a, Pm4b, Pm4c and Pm4d. The voltage level of the fourth mode power Pm4a, Pm4b, Pm4c and Pm4d can be set to be equal or greater than the power P2.

As shown in FIGS. 2C and 8, in the condition of the state C4, the processor 140 can control the power supplying unit 110 to convert the supplying power Pbus of the power bus 130 into the output power P4, so that the output power P4 is fed back to the power supplying source PS (e.g. mains electricity grids). It can be understood that the battery charging station 100 would not stand idle and can output the electrical power of the batteries B1-B4 to the power supplying source PS when the electrical power of the batteries B1-B4 is nearly saturated. By such feedback mechanism, the operator of the battery charging station 100 can require the electricity provider for grants or discount to the electricity bill.

In the above-described embodiments, the battery charging station 100 of the present disclosure has multiple voltage convertors. Person in the art should understand that the above-described voltage convertor can be implemented by the transformer circuit with different specification in some embodiments. Generally speaking, the above-described circuit can includes transistor or other circuit components which are arranged in the way of the above-described embodiments, so that the above-described circuit can operate according to the above-described functions and operations of the present disclosure. Furthermore, the coordinated programs between the processor 140 and the voltage/current convertor of the battery charging station 100 can be implemented by the specific compiler, such as register transfer language (RTI) compiler, etc. However, the present disclosure is not limited thereto.

According to the above-described embodiments, the present disclosure at least has following advantages: (1) the portable battery in the battery charging station can be used as the uninterruptible power system, so that the uninterruptible power system having idle batteries is not required; (2) once the external electrical power supply (e.g. mains electricity) is unavailable, the operation of the battery charging station can be maintained without any delay; (3) the battery charging station can be operated for a long time by the battery disposed in the battery charging station when the external electrical power supply is unavailable; (4) when the external electrical power supply is unavailable, the electrical power of the batteries can still be dynamically arranged, so as to try to provide the battery having higher electrical power to the user; (5) if the exterior has requirement and the electrical power of the batteries in the battery charging station is enough, the battery charging station can provide the electrical power to the exterior (e.g. mains electricity end).

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A battery charging station, comprising:
  a power bus;
  a power supplying unit coupled to the power bus and configured to generate a second power according to a first power received from the exterior and transmit the second power to the power bus as a supplying power of the power bus;

a first voltage converting unit coupled to the power bus and configured to connect to a first battery removably disposed in the battery station; and a processor electrically coupled to the power bus and communicatively coupled to the first voltage converting unit, wherein when the processor controls the first voltage converting unit to operate in a first mode, the first voltage converting unit in the first mode receives the supplying power from the power bus so as to charge the first battery, when the processor controls the first voltage converting unit to operate in a second mode, the first voltage converting unit in the second mode receives the electrical power from the first battery and generates a second mode power towards the power bus, wherein a voltage level of the second mode power is lower than a voltage level of the second power, wherein the first battery is configured to power a vehicle when the first battery is removed from the battery charging station.

2. The battery charging station of claim 1, wherein when the power supplying unit normally generates the second power and the processor sets the first voltage converting unit to operate in the second mode, the voltage level of the second mode power of the power bus equals the voltage level of the second power.

3. The battery charging station of claim 1, wherein when the power supplying unit does not generate the second power, the first voltage converting unit in the second mode transmits the second mode power to the power bus as the supplying power, so that the processor receives the supplying power from the power bus.

4. The battery charging station of claim 1, wherein:

when the first voltage converting unit operates in the first mode and the voltage level of the second power is greater than a first threshold, the first voltage converting unit converts the supplying power into a first mode power so as to charge the first battery, wherein the first threshold is greater than the voltage level of the second mode power.

5. The battery charging station of claim 4, wherein:

when the processor controls the first voltage converting unit to operate in a third mode, the first voltage converting unit in the third mode receives the electrical power from the first battery so as to output a third mode power towards the power bus as the supplying power, wherein the voltage level of the third mode power is greater than the first threshold.

6. The battery charging station of claim 5, wherein the battery charging station further comprises:

a second voltage converting unit electrically coupled to the power bus, configured to connect to a second battery removably disposed in the battery charging station, and communicatively coupled to the processor, wherein when the processor controls the first voltage converting unit to operate in the third mode and controls the second voltage converting unit to operate in the first mode, the second voltage converting unit receives the third mode power used as the supplying power so as to charge the second battery.

7. The battery charging station of claim 5, wherein the battery charging station further comprises:

a third voltage converting unit electrically coupled to the power bus, configured to connect to a third battery removably disposed in the battery charging station, and communicatively coupled to the processor, wherein when the processor controls the first voltage converting unit and the second voltage converting unit to respectively operate in the third mode and controls the third voltage converting unit to operate in the first mode, the first voltage converting unit and the second voltage converting unit in the third mode each generates the third mode power to the power bus as the supplying power, the supplying power is the sum of the third mode power of the first voltage converting unit and the second voltage converting unit, and the third voltage converting unit receives the supplying power so as to charge the third battery.

8. The battery charging station of claim 1, wherein when the processor controls the first voltage converting unit to operate in a fourth mode, the first voltage converting unit in the fourth mode receives the electrical power from the first battery so as to output a fourth mode power towards the power bus as the supplying power of the power bus, and the processor controls the power supplying unit to generate an output power according to the supplying power of the power bus.

9. The battery charging station of claim 1, wherein the power supplying unit comprises a bidirectional AC/DC converter or a bidirectional DC/DC converter, and the first voltage converting unit comprises a bidirectional DC/DC converter.

10. The battery charging station of claim 1, wherein the processor generates a mode control signal to the first voltage converting unit so as to switch the mode of the first voltage converting unit.

11. A method for managing batteries applied to a processor of a battery charging station, wherein the battery charging station comprises a power supplying unit and a first voltage converting unit which are coupled to a power bus, the first voltage converting unit is connected a first battery removably disposed in the battery charging station, and the method for managing batteries comprises:

controlling the power supplying unit to receive a first power from the exterior and generate a second power, wherein the power supplying unit transmits the second power to the power bus as a supplying power of the power bus; and controlling the first voltage converting unit to switch between at least a first mode or a second mode, wherein the first voltage converting unit in the first mode receives the supplying power from the power bus so as to charge the first battery, wherein the first voltage converting unit in the second mode receives the electrical power from the first battery and generates a second mode power towards the power bus, wherein a voltage level of the second mode power is lower than a voltage level of the second power, wherein the first battery is configured to power a vehicle when the first battery is removed from the battery charging station.

12. The method for managing batteries of claim 11, wherein when the power supplying unit normally generates the second power, the method for managing batteries comprises:

controlling the first voltage converting unit to operate in the second mode, wherein the voltage level of the second mode power equals the voltage level of the second power.

13. The method for managing batteries of claim 11, wherein when the power supplying unit does not generate the second power, the first voltage converting unit in the second mode transmits the second mode power to the power bus as the supplying power, so that the processor receives the supplying power from the power bus.

14. The method for managing batteries of claim 11, wherein when the first voltage converting unit operates in the first mode and the voltage level of the second power is greater than a first threshold, the first voltage converting unit converts the supplying power into a first mode power so as to charge the first battery, wherein the first threshold is greater than the voltage level of the second mode power.

15. The method for managing batteries of claim 14, further comprising:
controlling the first voltage converting unit to operate in a third mode, wherein the first voltage converting unit in the third mode receives the electrical power from the first battery so as to output a third mode power towards the power bus as the supplying power, and the voltage level of the third mode power is greater than the first threshold.

16. The method for managing batteries of claim 15, wherein the battery charging station further comprises a second voltage converting unit electrically coupled to the power bus, the second voltage converting unit is configured to connect to a second battery removably disposed in the battery charging station, the second voltage converting unit is communicatively coupled to the processor, and the method for managing batteries comprises:
controlling the first voltage converting unit to operate in the third mode and controlling the second voltage converting unit to operate in the first mode, wherein the second voltage converting unit receives the third mode power used as the supplying power so as to charge the second battery.

17. The method for managing batteries of claim 15, wherein the battery charging station further comprises a third voltage converting unit electrically coupled to the power bus, the third voltage converting unit is configured to connect to a third battery removably disposed in the battery charging station, the third voltage converting unit is communicatively coupled to the processor, and the method for managing batteries comprises:
controlling the first voltage converting unit and the second voltage converting unit to respectively operate in the third mode and controlling the third voltage converting unit to operate in the first mode, wherein the first voltage converting unit and the second voltage converting unit in the third mode each generates the third mode power to the power bus as the supplying power, the supplying power is the sum of the third mode power of the first voltage converting unit and the second voltage converting unit, and the third voltage converting unit receives the supplying power so as to charge the third battery.

18. The method for managing batteries of claim 11, further comprising:
controlling the first voltage converting unit to operate in a fourth mode, wherein the first voltage converting unit in the fourth mode receives the electrical power from the first battery so as to output a fourth mode power towards the power bus as the supplying power of the power bus, and the processor controls the power supplying unit to generate an output power according to the supplying power of the power bus.

19. The method for managing batteries of claim 11, further comprising:
generating a mode control signal to the first voltage converting unit, wherein the mode control signal is configured to switch the mode of the first voltage converting unit.

20. The method for managing batteries of claim 11, further comprising:
when the power supplying unit does not generate the second power and a plurality of batteries removably disposed in the battery charging station each has the electricity lower than an electricity threshold, correspondingly displaying a message or playing a sound.

* * * * *